United States Patent
Eder et al.

(10) Patent No.: US 12,297,063 B2
(45) Date of Patent: May 13, 2025

(54) FILM WINDING SYSTEM AND ASSEMBLY COMPRISING A FILM STRETCHING UNIT AND SUCH A FILM WINDING SYSTEM

(71) Applicant: BRÜCKNER MASCHINENBAU GmbH, Siegsdorf (DE)

(72) Inventors: Christoph Eder, Kolbermoor (DE); Helmut Gumpinger, Anger (DE); Berthold Eichner, Yuanlin (TW); Florian Kellnberger, Grafing (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 280 days.

(21) Appl. No.: 17/876,359

(22) Filed: Jul. 28, 2022

(65) Prior Publication Data
US 2023/0036198 A1     Feb. 2, 2023

(30) Foreign Application Priority Data
Jul. 29, 2021    (DE) ...................... 10 2021 119 724.4

(51) Int. Cl.
*B65H 18/26*         (2006.01)
(52) U.S. Cl.
CPC ......... *B65H 18/26* (2013.01); *B65H 2402/32* (2013.01); *B65H 2402/52* (2013.01);
(Continued)
(58) Field of Classification Search
CPC .............................. B65H 18/26; B65H 2402/32
See application file for complete search history.

(56) References Cited

U.S. PATENT DOCUMENTS

| 3,279,718 | A | | 10/1966 | Arterton et al. |
| 5,285,979 | A | * | 2/1994 | Francesco .............. B65H 18/26 |
| | | | | 242/541.7 |

(Continued)

FOREIGN PATENT DOCUMENTS

| DE | 36 00 517 | 7/1987 |
| DE | 41 03 799 | 8/1992 |

(Continued)

OTHER PUBLICATIONS

Official Communication for Application No. EP 22184819.5, three pages, dated Dec. 21, 2022.
(Continued)

*Primary Examiner* — Sang K Kim
(74) *Attorney, Agent, or Firm* — Nixon & Vanderhye P.C.

(57) ABSTRACT

A film winding system is disclosed having a first winding station which is configured in a winding position to wind the film web into a film bale. A contact roller and a compensating roller are provided, wherein the contact roller is arranged adjacent to the first winding station in the winding position and is configured to guide the film web to the first winding station. The compensating roller is located before the contact roller in the direction of travel of the film web and is configured to guide the film web to the contact roller and to set a film tension. A first adjustment device is provided and configured to move the contact roller towards the winding station or away from the winding station, thereby enabling the setting of a specific contact pressure between the contact roller and the film bale. The first adjustment device comprises a slide system or an adjusting spindle.

18 Claims, 12 Drawing Sheets

(52) U.S. Cl.
CPC .. *B65H 2404/10* (2013.01); *B65H 2404/1452* (2013.01); *B65H 2404/17* (2013.01)

(56) References Cited

U.S. PATENT DOCUMENTS

| | | | | |
|---|---|---|---|---|
| 5,308,008 | A * | 5/1994 | Ruegg | B65H 18/26 |
| | | | | 242/541.7 |
| 5,967,449 | A * | 10/1999 | Thomas | B65H 18/26 |
| | | | | 242/542.3 |
| 10,246,284 | B2 * | 4/2019 | Pellengo Gatti | B65H 23/26 |
| 2016/0083211 | A1 | 3/2016 | Pellengo Gatti | |

FOREIGN PATENT DOCUMENTS

| | | |
|---|---|---|
| DE | 196 20 670 | 7/1998 |
| DE | 10 2019 112 089 | 11/2020 |
| DE | 10 2019 119 600 | 1/2021 |
| EP | 0 237 903 A1 | 9/1987 |
| EP | 0 819 638 A2 | 1/1998 |
| KR | 1990-0007808 B1 | 10/1990 |
| KR | 10-1998-0010014 A | 4/1998 |
| WO | 2013/075258 | 5/2013 |

OTHER PUBLICATIONS

Official Communication for Application No. EP 22184819.5, two pages, dated Jul. 6, 2023.
Notice of Office Action for Application No. KR 10-2022-0091792, 10 pages, dated Feb. 15, 2025.

* cited by examiner

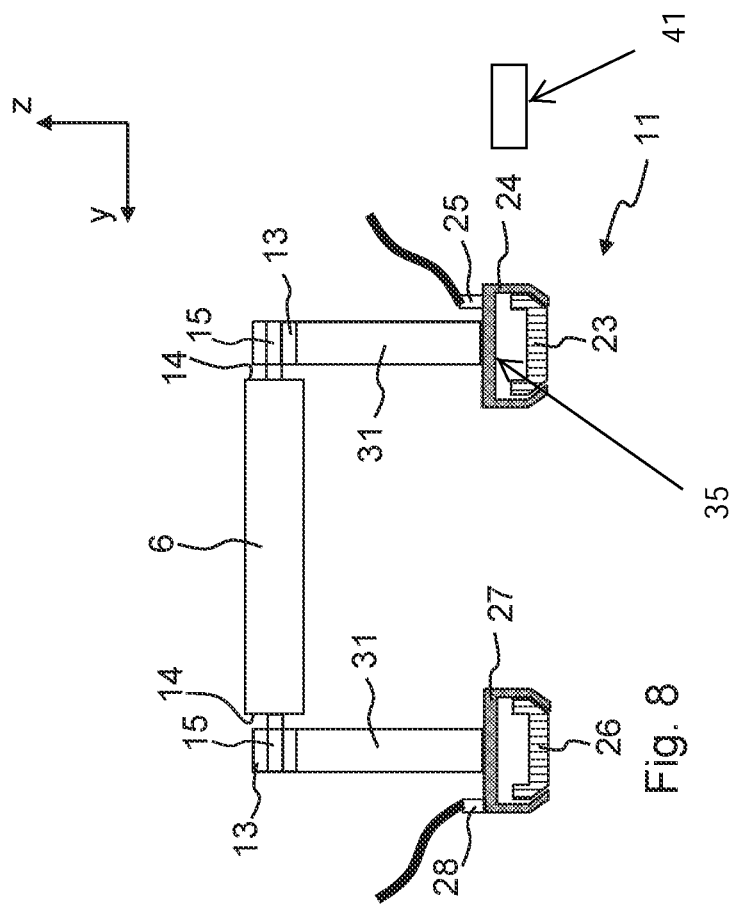
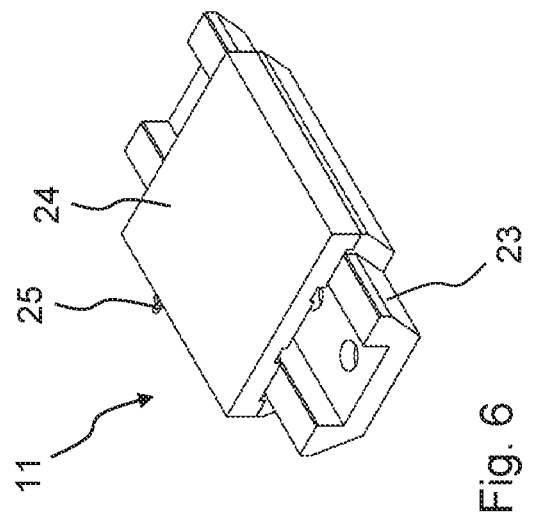
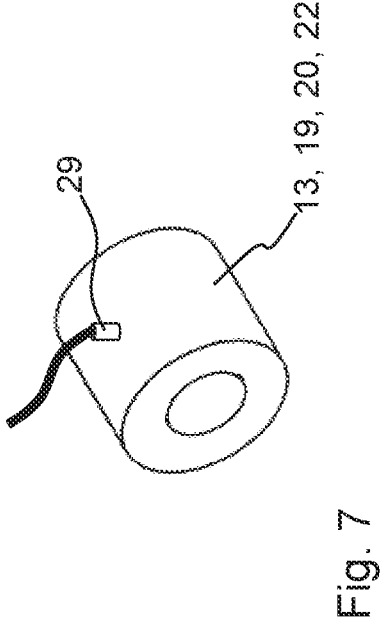

FILM WINDING SYSTEM AND ASSEMBLY COMPRISING A FILM STRETCHING UNIT AND SUCH A FILM WINDING SYSTEM

CROSS RELATED APPLICATION

This application claims priority to German Patent Application DE 10 2021 119 724.4, filed Jul. 29, 2021, the entire contents of which is hereby incorporated by reference.

FIELD OF THE DISCLOSURE

The disclosure relates to a film winding system, an assembly comprising a film stretching unit and such a film winding system and use of such an assembly for producing biaxially stretched extra-thin films, in particular battery separator films, a PP capacitor film or a PET capacitor film or membranes, such as PTFE membranes (polytetrafluoroethylene). The PP capacitor film and the PET capacitor film are preferably stretched biaxially. Extra-thin films have thickness that are preferably smaller than 5 μm.

BACKGROUND

Film stretching units are used to produce a film web from a plastic melt 39, said film web having particular material properties that can be used for particular purposes. The film stretching units comprise longitudinal and/or transverse stretching zones. The line speed has been constantly increasing and nowadays is already more than 400 m/min. In the future, even faster film stretching units are intended to be put into operation. In this context, an important aspect is also how the finished end product, namely the film web, is wound up. Film winding systems are provided for this purpose that wind the film web produced. When winding, however, it is important that no folds are pressed into the film web so that the individual layers can be separated from each other more easily later. The film web is wound up at a winding station. This comprises a corresponding base body around which the film web is wound. However, the film web is fed to an internally known winding station via a contact roller to ensure optimum alignment before winding.

Depending on the type of film to be produced, particular line parameters must still be adhered to or attained. The production of extra-thin films, such as a battery separator film, is very demanding. In contrast to films, which for example are made of PET or PP, only low film tension can be applied in the production of extra-thin films such as battery separator films. The film tensions range from 1 N/m to 200 N/m. Preferably, the film tensions range from 5 N/m to 15 N/m. Due to the viscoelastic property of battery separator films, it is not possible to have a high contact force of a contact roller on the film bales (winding bales) and on the winding reel. Thus, the contact force is preferably to range from 0 N/m to 100 N/m. More preferably, the contact force is to range from 1 N/m to 10 N/m. Otherwise, winding errors can occur, for example the telescoping of the film web. This is to be avoided.

The production of battery separator films is described, for example, in DE 10 2019 112 089 and DE 10 2019 119 600, whose content regarding the production of battery separator films is included herewith in this patent application.

Fundamentally, to be able to set the low film tension and in particular the low contact force is difficult as the entire system is very slow and the film bales are not perfectly round.

SUMMARY

Thus, there is a need to provide a film winding system that can realise film tensions that are as low as possible and a contact force between contact roller and film bale that is as low as possible.

Thus, there is provided the film winding system according to the pending claims directed toward an assembly comprising a film stretching unit and a film winding system. In the dependent claims, further embodiments of the film winding system are described.

The film winding system comprises a film entry area, via which the film web to be wound is feedable into the film winding system. Furthermore, a first winding station is provided. The first winding station is configured in a winding position to wind the film web into a film bale. Furthermore, a contact roller and a compensating roller are provided. The contact roller is arranged (directly) adjacent to the first winding station (if this is located in the winding position) and is configured to guide the film web to the first winding station. The wording "directly" is understood to mean that the contact roller is in contact with the film bale and that only the film web that is wound on the film bale runs between the contact roller and the film bale. However, a free space could also be formed between the contact roller and the film bale. This free space is preferably smaller than 1000 mm, 900 mm, 800 mm, 700 mm, 600 mm, 500 mm, 400 mm, 300 mm, 200 mm, 100 mm, 50 mm, 30 mm, 20 mm or smaller than 10 mm. The compensating roller is located before the contact roller in the direction of travel of the film web and is configured to guide the film web to the contact roller and to set a film tension. The wording "in the direction of travel of the film web" is understood to be mean that a certain area of the film web first runs across the compensating roller and only afterward across the contact roller. Furthermore, the first adjustment device is provided and configured to move the contact roller towards the winding station or away from the winding station, thereby enabling the setting of a specific contact pressure between the contact roller and the film bale.

It is particular advantageous that the adjustment device comprises a slide system. The slide system can be, for example, an air-bearing slide system or a hydrostatic-bearing slide system. An air-bearing slide system produces a film of air between a slide and a rail, thereby enabling the slide to move relative to the rail without any appreciable friction. As a result, the friction is minimised in the horizontal movement of the contact roller and the contact roller can be positioned particularly exactly and precisely. Alternatively, the contact roller can also be moved via an adjusting spindle. As a result, particular large weights can be moved.

In a further embodiment of the film winding system, the air-bearing slide system of the first adjustment device comprises a first rail and at least a first slide that is located on the first rail. The first slide comprises air outlet openings that are directed in the direction of the first rail. The first slide comprises, furthermore, an air connection to allow the feeding of compressed air that then exits the air outlet openings, thereby enabling the first slide to be slidable on the first rail.

In a further embodiment of the film winding system, the first slide grasps the first rail from at least three sides. As a result, the design is particularly very stable. In principle, it is conceivable that the air outlet openings are also directed at more than one side on the first rail. It is conceivable that the air outlet openings are also directed at three different sides of the first rail. As a result, the first slide is stabilized particularly well.

In further embodiment of the film winding system, the air-bearing slide system of the first adjustment device comprises a second rail and at least a second slide that is located on the second rail. The second slide comprises air outlet openings that are directed in the direction of the second rail. The second slide comprises an air connection to allow the feeding of compressed air. The compressed air then exits the air outlet openings, thereby enabling the second slide to be slidable on the second rail. The second rail runs parallel to the first rail. In principle, the second slide of the second rail can have the same properties as the first slide of the first rail. By using a second rail with a second slide, the weight of the contact roller can be distributed better and the contact roller can be supported more stably.

In a further embodiment of the film winding system, the air-bearing slide system of the first adjustment device comprises a third slide that is located on the first rail. The third slide comprises air outlet openings that are directed in the direction of the first rail. The third slide comprises an air connection to allow the feeding of compressed air that then exits the air outlet openings, thereby enabling the third slide to be slidable on the first rail. The first rail runs continuously or is divided into two rail sections for the first and the third slides, said rail sections being spaced apart. By using two slides that are preferably slidable coaxially to each other, the stability with which the contact roller moves can be increased further.

In a further embodiment of the film winding system, the first adjustment device comprises a first and a second radial air bearing. The contact roller comprises first and second journals in the area of the first and the second end face, said journals being supported in the first and second radial air bearings or in the first and second hydrostatic bearings (hydraulics). As a result, the friction when rotating the contact roller is reduced further. Preferably, the contact roller is set in rotation only by the film web resting on contact roller. In an embodiment, it was thus possible to dispense with the use an electric motor. However in another embodiment, the contact roller is drivable via an electric motor. This electric motor is located directly on the contact roller or connected to the contact roller via a transmission means, such as a chain. Rotating the shaft of the electric motor also then leads to rotation of the contact roller.

In a further embodiment of the film winding system, the first adjustment device comprises a linear motor that is configured to move the contact roller via the air-bearing slide system or the hydrostatic-bearing slide system towards the first winding station or away from the first winding station. The contact roller can be positioned very precisely by means of such a linear motor combined with the air-bearing slide system or the hydrostatic-bearing slide system. Alternatively, the first adjustment device comprises an electric motor that is configured to rotate the adjusting spindle, thereby enabling the contact roller to be moveable towards the first winding station or away from the first winding station.

In a further embodiment of the film winding system, a control device is provided that is configured to control the linear motor or the electric motor of the first adjustment device in such a way that the contact roller rests on the film bale at a predetermined contact pressure. In principle, a corresponding pressure sensor for measuring the contact pressure can be provided for this.

In a further embodiment of the film winding system, a first deflection roller is provided. The first deflection roller is located before the compensating roller in the direction of travel of the film web. Through the corresponding first deflection roller, the degree of wrapping over which the film web rests on the compensating roller can be increased. At the same time, the material web is steadied. A "degree of wrapping" is understood to mean a value of how far the film web coves the compensating roller. The compensating roller extends over 360°. At a degree of wrapping of 90°, the film web would only rest on a quarter of the circumferential surface of the particularly cylindrical compensating roller. With a degree of wrapping of 180°, however, the film web would rest on half of the circumferential surface of the particularly cylindrical compensating roller.

In a further embodiment of the film winding system, a distance between the first deflection roller and the contact roller is less than the distance between the compensating roller and the contact roller. As a result, a degree of wrapping can be achieved, over which the film web covers the compensating roller, that is larger than 120°, 130°, 140° or is larger than 150°.

In a further embodiment of the film winding system, the first deflection roller is mounted rotatably by means of a radial air bearing or a hydrostatic bearing. As a result of the low friction between the deflection roller and the radial air bearing or the hydrostatic bearing, the first deflection roller is preferably set in rotation only by the film web itself so that the use of an electric motor can be dispensed with in an embodiment. In another embodiment, the first deflection roller is drivable however via an electric motor. This electric motor is located directly on the first deflection roller or connected to the first deflection roller via a transmission means, such as a chain. Rotating the shaft of the electric motor also then leads to rotation of the first deflection roller.

In a further embodiment of the film winding system, a second deflection roller is provided. The second deflection roller is located after the compensating roller and before the contact roller in the direction of travel of the film web.

In a further embodiment of the film winding system, the second deflection roller is also mounted rotatably by means of a radial air bearing or a hydrostatic bearing. As a result of the low friction between the deflection roller and the radial air bearing or the hydrostatic bearing, the second deflection roller is preferably set in rotation only by the film web itself so that the use of an electric motor can be dispensed with in an embodiment. In another embodiment, the second deflection roller is drivable however via an electric motor. This electric motor is located directly on the second deflection roller or connected to the second deflection roller via a transmission means, such as a chain. Rotating the shaft of the electric motor also then leads to rotation of the second deflection roller.

In a further embodiment of the film winding system, a contact roller frame is provided. The air-bearing slide system or the hydrostatic-bearing slide system of the first adjustment device is located on the contact roller frame so that the contact roller is moveable relative to the contact roller frame. Alternatively to this, the contact roller frame is located on the air-bearing slide system or the hydrostatic-bearing slide system of the first adjustment device, wherein the contact roller is located on the contact roller frame so that the contact roller and the contact roller frame are moveable collectively.

In a further embodiment of the film winding system, the first deflection roller and/or the second deflection roller and/or the compensating roller are located on the contact roller frame. If the contact roller frame is moved via the first adjustment device, this also applies to the first and/or second deflection roller and the compensating roller. As a result, the movement is synchronous.

In a further embodiment of the film winding system, a base adjustment device is provided that comprises a base frame and an air-bearing slide system or a hydrostatic-bearing slide system or an adjusting spindle. The contact roller and the compensating roller and the first deflection roller and/or the second deflection roller are located on the base frame. The base adjustment device is configured to move the contact roller, the compensating roller, the first deflection roller and/or the second deflection roller towards the winding station or away from the winding station. In this case, there is both the first adjustment device and at the same time a principal base adjustment device so that settings can be carried out particularly accurately.

In a further embodiment of the film winding system, a second adjustment device is provided and configured to move the compensating roller towards the contact roller or away from the contact roller, thereby enabling the setting of a specific film tension. The second adjustment device comprises an air-bearing slide system or a hydrostatic-bearing slide system or an adjusting spindle. It is particular advantageous that the compensating roller is moved using an air-bearing slide system. Due to the low friction coefficient, the film tension can be set very precisely.

In a further embodiment of the film winding system electric motor, the second adjustment device comprises a linear motor or an electric motor that is configured to move the compensating roller via the air-bearing slide system or the hydrostatic-bearing slide system or the adjusting spindle towards the contact roller or away from the contact roller. The position and force can be set very accurately via such a linear motor or electric motor.

In a further embodiment of the film winding system, a control device is provided that is configured to control the linear motor or the electric motor of the second adjustment device in such a way that a predetermined film tension is applied via the compensating roller.

In a further embodiment of the film winding system, the compensating roller is mounted rotatably by means of a radial air bearing or a hydrostatic bearing. As a result of the low friction between the compensating roller and the radial air bearing or the hydrostatic bearing, the compensating roller is preferably set in rotation only by the film web itself so that the use of an electric motor can be dispensed with in an embodiment. In another embodiment, the compensating roller is drivable however via an electric motor. This electric motor is located directly on the compensating roller or connected to the compensating roller via a transmission means, such as a chain. Rotating the shaft of the electric motor also leads to rotation of the compensating roller.

In a further embodiment of the film winding system, the first winding station comprises a base body, wherein the base body of the first winding station is rotationally displaceable and wherein the film web can be wound around the base body. Furthermore, there is a second winding station comprising a base body, wherein the base body of the second winding station is rotationally displaceable and wherein the film web can be wound around the base body. The first winding station is configured to be pivoted from the winding position, in which it is arranged adjacent to the contact roller, into an unloading position, wherein the wound film bale is removable from the first winding station in the unloading position and wherein the second winding station is configured to be pivoted at the same time from the unloading position into the winding position. There is furthermore a cutting device that is configured to cut the film web across its width when the first winding station is pivoted in the direction of the unloading position, wherein the second winding station is configured to be pivoted further into the winding position in such a way that the base body of the second winding station immediately comes into contact with the new beginning of the film web now formed.

In another embodiment, the film winding system comprises at least a discharge device. The discharge device is located in the area of the film web and is configured discharge electrical charge on the film web and/or film bale.

The discharge device preferably comprises a plurality of flexible/free-moving electrically conductive metal strips (a type of tinsel strip) which can be brought into contact with the film web. These metal strips are preferably distributed across the entire width of the film web or across most of the width of the film web. In principle, a discharge conductor could also be used. This or these discharge conductors would be located preferably at a distance from the film web. The distance should be preferably smaller then 200 mm, 150 mm, 100 mm, 50 mm, 40 mm, 30 mm, 20 mm, 10 mm or smaller than 5 mm. Preferably, however, the distance is larger than 5 mm. An alternating electric field is applied to this discharge conductor. This alternating electric field is high voltage, thereby enabling the static charge to be discharged.

The assembly comprising the film winding system and a film stretching unit according to the disclosure, in particular a sequential stretching unit known in the prior art, a simultaneous stretching unit or a battery separator film stretching unit (Evapore process or WET process) allows the film winding system to be connected to an exit area of the film stretching unit. The film stretching unit comprises an entry area at which a film can be fed into it. Furthermore, the film stretching unit comprises various zones in which the plastic film is heated and stretched into a mono-axially or bi-axially oriented film web (for example, via a longitudinal stretching stage and/or via a transverse stretching stage or oven). The resulting film web is then fed to the film winding system. In a WET process, the cast film contains a solvent (e.g. white oil), wherein the cast film is stretched in the machine direction or the traverse direction (sequentially or simultaneously). Subsequently, the stretched film is feed into a washing bath. In the washing bath, the dichloromethane contained in it washes out the solvent (e.g. white oil). Subsequently, the film is fed into a TDO in order to stretch the film again minimally and to anneal it. Subsequently, the film is wound up.

The use of the assembly enables extra-thin films, e.g. battery separator films, PP capacitor films or PET capacitor films or membranes, e.g. PTFE membranes to be producible and windable. The films can be wound up even if the thickness is less than 15 μm. Battery separator films usually have a thickness ranging from 8 to 15 μm and PP capacitor films from 2 to 6 μm.

Different embodiments of the disclosure are described by way of example with reference to the drawings hereinafter. Same objects have the same reference signs. The corresponding figures of the drawings show in detail:

BRIEF DESCRIPTION OF THE DRAWINGS

FIG. 6: an embodiment of an air-bearing slide system;

FIG. 7: an embodiment of a radial air bearing;

FIG. 8: an embodiment of the contact roller that is mounted on a contact roller frame which is located on the air-bearing slide system;

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than three items.

Figure 1:
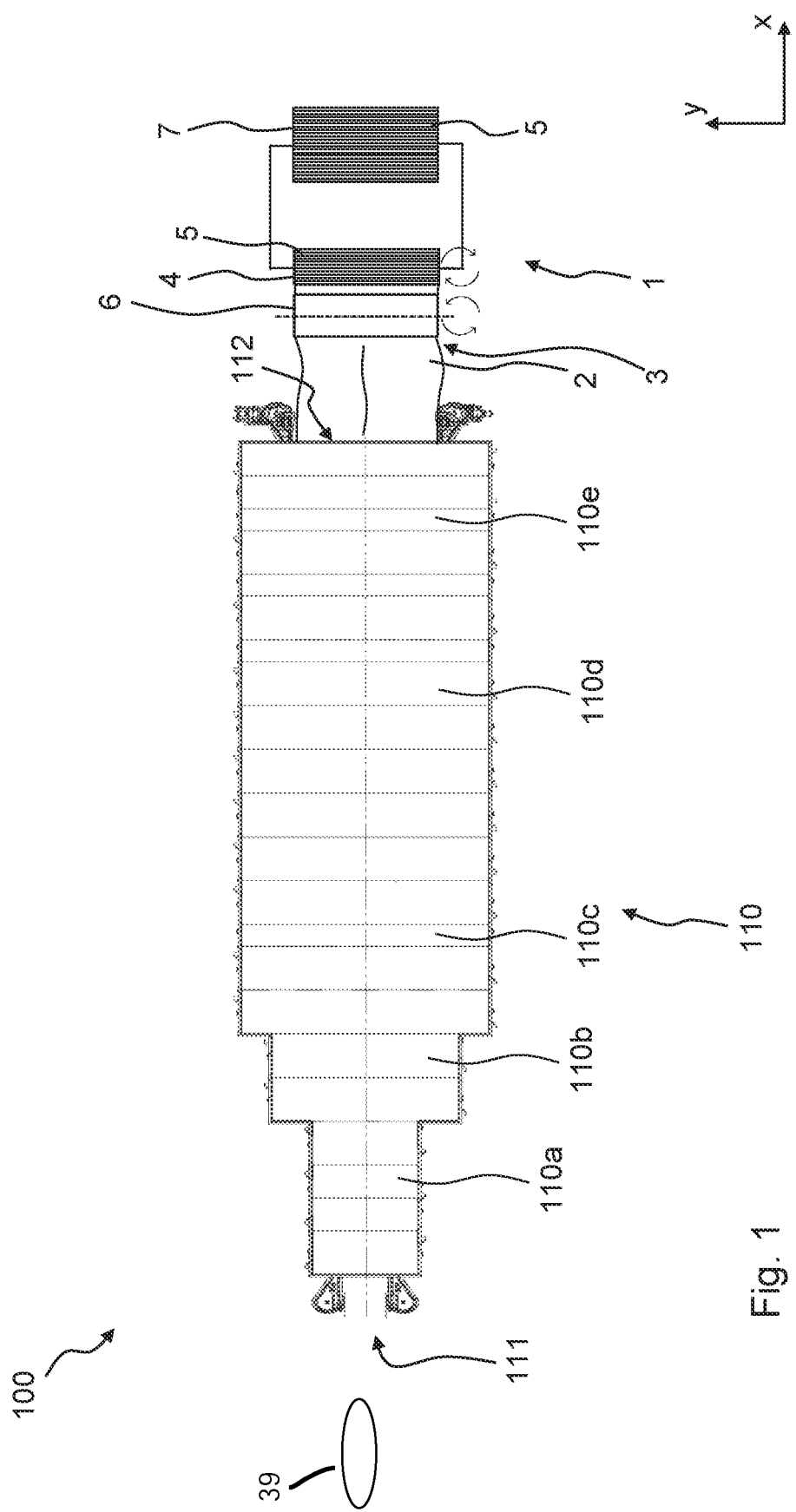
FIG. 1: an assembly comprising a film winding system and a film stretching unit.
Figure 2:
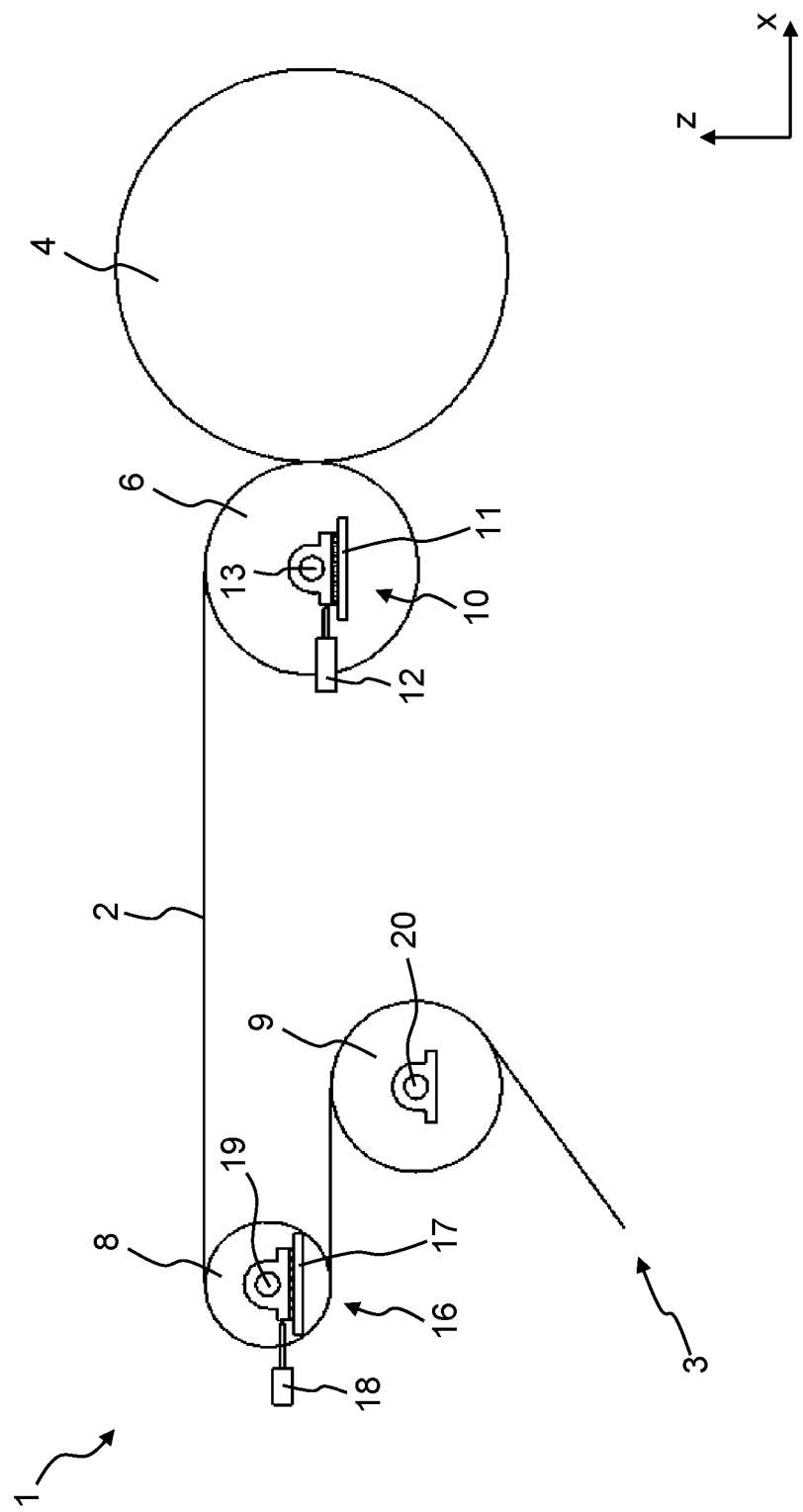
FIG. 2: an embodiment of the film winding system comprising a compensating roller and a contact roller.

FIG. 1 shows an assembly 100 of a film winding system 1 according to the disclosure and a film stretching unit 110. The film stretching unit 110 can be configured as a machine direction orienter or transverse direction orienter or sequential stretching unit comprising a longitudinal stretching stage and a transverse stretching stage or as a simultaneous stretching unit. The film stretching unit 110 is used to produce a plastic film web 2 that is hereinafter referred to as film web 2. For this purpose, the film stretching unit 110 is divided into different zones 110a, 110b, 110c, 110d and 110e. Of course, not all of these zones 110a, 110b, 110c, 110d and 110e actually need to be present. In the various zones 110a to 110e, the film web 2 is exposed to different temperatures in order to generate or set certain film properties. The first zone 110a is also referred to as the preheating zone. The second zone 110b is referred to as the stretching zone, whereas the third zone 110c is referred to as the further heating zone. The fourth zone 110d is also referred to as the neutral zone and the fifth zone 110e as the cooling zone. In principle, there may be fewer or additional neutral zones between the individual zones 110a to 110e to ensure a separation of the zones 110a to 110e so that the individual zones 110a to 110e have less impact on each other (the air flows from one zone 110a to 110e into the other). The film stretching unit 110 makes it possible to produce film webs having a width that is larger than 2 m, 3 m, 4 m, 5 m, 6 m, 7 m, 8 m, 9 m, 10 m, 11 m or larger than 12 m, but is preferably smaller than 13 m, 12 m, 11 m, 10 m, 9 m, 8 m, 7 m, 6 m, 5 m, 4 m or smaller than 3 m.

The film stretching unit 110 comprises an entry area 111, wherein a film to be stretched can be fed into the film stretching unit 110 at its entry area 111. The stretched film web 2 exits at the end of the film stretching unit 110, thus at its exit area 112. The exit area 112 of the film stretching unit 110 is connected to a film entry area 3 of the film winding system 1 according to the disclosure.

In the following FIGS. 2A, 2B, 3A to 3E and 4, the design of the film winding system 1 according to the disclosure is described in more detail.

As explained previously, different types of film should be wound up differently as only then can it be ensured that winding is carried out without folds and that sufficient air is introduced between the individual layers so that the film web 2 can be unwound without any difficulty in subsequent process steps. The method of winding according to the disclosure also ensures that the film web 2 does not tear.

As explained previously, the winding of battery separator films is particularly demanding. Winding can only be carried out under a low contact force and low film tension.

The FIGS. 2, 3, 4, 5 show embodiments that describe the film winding system 1. The film web 2 is fed from the film stretching unit 110 to the film winding system 1. This occurs via the film entry area 3. The film web 2 then runs towards a first winding station 4 that is in a winding position. The first winding station 4 is configured to wind the film web 2 into a film bale 5 (see FIG. 3).

The film winding system 1 comprises a contact roller 6 and a compensating roller 8. The contact roller 6 is arranged adjacent to the first winding station 4 and is configured to guide the film web 2 to the first winding station 4. The compensating roller 8 is located before the contact roller 6 in the direction of travel of the film web 2 and is configured to guide the film web 2 to the contact roller 6 and to set a film tension.

Also represented is a first deflection roller 9 that is located in the direction of travel of the film web 2 before the compensating roller 8. The film web 2 is then fed to the first deflection roller 9 via the film entry area 3. From the first deflection roller 9, the film web 2 runs via the compensating roller 8 towards the contact roller 6 before it is wound into a film bale 5 at the first winding station 4.

Furthermore, there is a first adjustment device 10 that is configured to move the contact roller 6 (in the X-axis) towards the winding station 4 or away from the winding station 4. As a result, a predetermined contact pressure can be set between the contact roller 6 and the film bale 5. If the contact pressure is above a first threshold value, the contact roller 6 is moved away from the film bale 5. If the contact pressure is below a second threshold value, the contact roller 6 is moved towards the film bale 5. The first and second threshold values can be the same or different. The first adjustment device 10 comprises a slide system. The slide system is preferably an air-bearing slide system 11. The slide system could also be a hydrostatic-bearing slide system. This allows the contact roller 6 to be slid with a minimal expenditure of energy, in particular, as the jerk to initially move the contact roller 6 from its idle position is minimal due to an air bearing.

The first adjustment device 10 also comprises a linear motor 12 that is configured to move the contact roller 6 via the air-bearing slide system 11 towards the first winding station 4 or away from the first winding station 4. The movement preferably only occurs horizontally (parallel to the ground).

Furthermore, there is a control device (not shown) that is configured to control the linear motor 12 of the first adjustment device 10 in such a way that the contact roller 6 rests on the film bale 5 at a predefined contact pressure.

The first adjustment device 10 comprises, furthermore, a first and a second radial air bearing 13. The contact roller 6 comprises first and second journals 15 in the area of the first and second end face 14. These are supported in the first and second radial air bearing 13. As a result, a separate electric motor for driving the contact roller 6 can be dispensed with. The contact roller 6 is preferably set in rotation only by the film tension of the film web 2. In principle, the use of an electric motor is however still possible. Hydrostatic bearings can also be used instead of the first and second radial air bearing 13.

Furthermore, a second adjustment device 16 is provided and configured to move the compensating roller 8 towards the contact roller 6 or away from the contact roller 6, thereby enabling the setting of a specific film tension. If the film tension is to be increased, the compensating roller 8 is moved away from the contact roller 6. As a result, the film is tightened. However, if the film tension is to be reduced, the compensating roller 8 is moved towards the contact roller 6.

The second adjustment device 16 also comprises an air-bearing slide system 17. This allows the compensating roller 8 to be slid with a minimal expenditure of energy, in particular, as the jerk to initially move the compensating roller 8 from its idle position is minimal due to an air bearing. The second adjustment device 16 could also comprise a hydrostatic-bearing slide system.

Moreover, the second adjustment device 16 comprises a linear motor 18. This is configured to move the compensating roller 8 via the air-bearing slide system 17 towards the contact roller 6 or away from the contact roller 6. The movement preferably only occurs horizontally (parallel to the ground).

Moreover, a control device (not shown) is provided that is configured to control the linear motor 18 of the second adjustment device 16 in such a way that a predetermined film tension is appliable via the compensating roller 8. The film tension can be measured via a force measuring device.

The control device for controlling the linear motor 12 of the second adjustment device 16 can also be used to control the linear motor 12 of the first adjustment device 10. However, two different control devices (for example in different microcontrollers) can also be used.

Preferably, the compensating roller 8 is also mounted rotatably by means of a radial air bearing 19. The compensating roller 8 can also be mounted rotatably by means of a hydrostatic bearing. Further preferably, the compensating roller 8 is not actively driven. It is preferably driven only passively by the film web 2. In principle, the use of an electric motor for driving the compensating roller 8 is however possible.

The first deflection roller 9 can preferably not be moved relative to the compensating roller 8 and/or the contact roller 6. The first deflection roller 9 is preferably also mounted rotatably by means of a radial air bearing 20. The first deflection roller 9 can also be mounted rotatably by means of a hydrostatic bearing. The first deflection roller 9 is preferably only driven passively, thus without an electric motor. This occurs only through the film tension of the film web 2. In principle, the use of an electric motor for driving the first deflection roller 9 is however possible.

Figure 3:
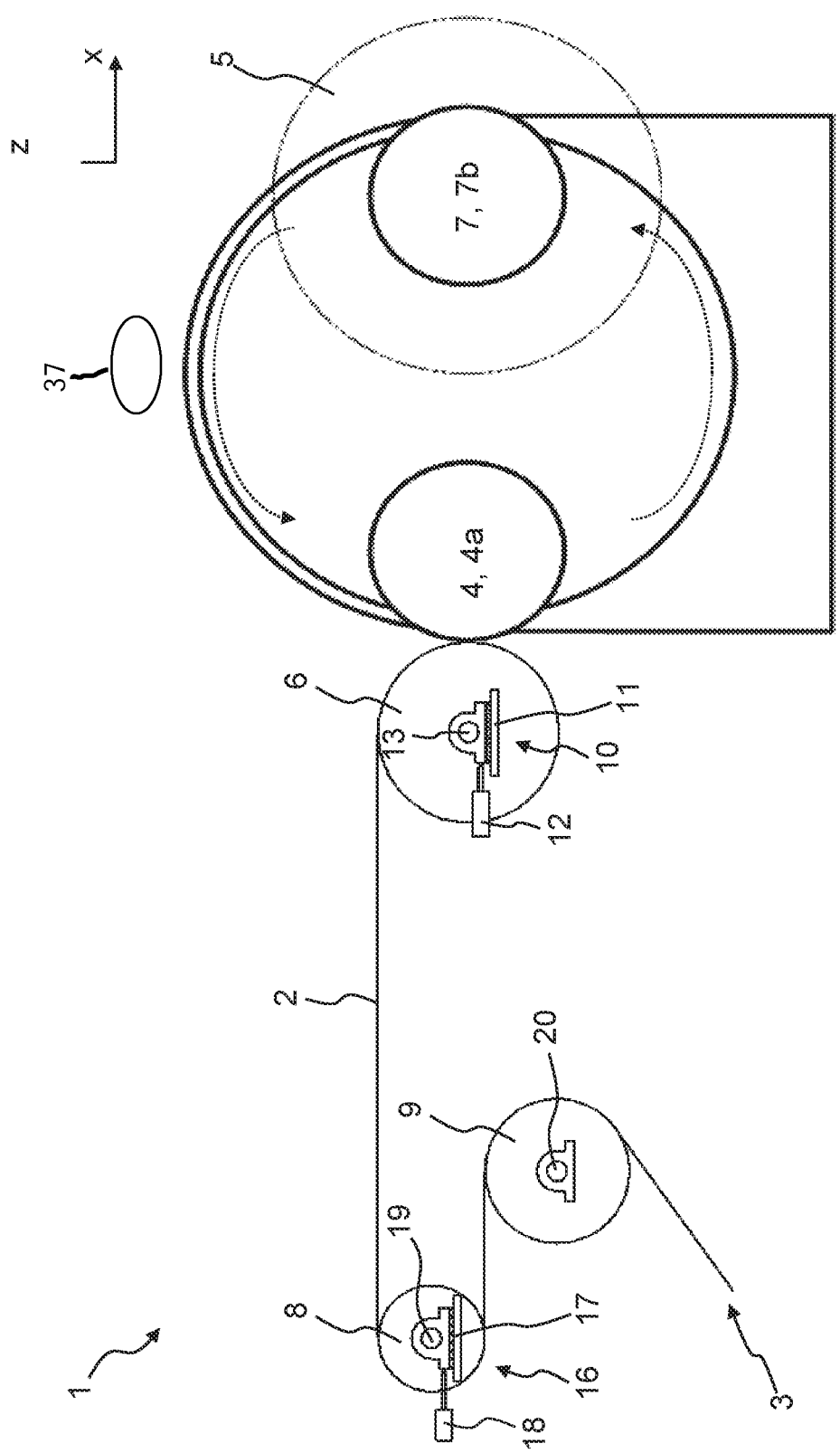
FIG. 3: an embodiment of the film winding system, wherein the use of a first and a second winding station is described.

With regards to FIG. 3, the first winding station 4 is shown comprising a base body 4a. The base body 4a of the first winding station 4 is rotationally displaceable. This can occur, for example, via an (electric) motor. In the simplest case, the base body 4a can be a (hollow) cylindrical piece of cardboard. Preferably, the base body 4a is however made of metal or CRP, GRP or a composite made of CRP and GRP. Furthermore, a second winding station 7 is also shown. The second winding station 7 also comprises a base body 7a. This base body 7a is also rotationally displaceable. Thus, the film web 2 can also be wound around the base body 7a of the second winding station 7. In the shown Figures, the first winding station 4 is moved into the winding position. In the winding position, the first winding station 4 is arranged adjacent to the contact roller 6. The second winding station 7 is moved or pivoted, on the other hand, into the unloading position. In the unloading position, the film bale 5 can be removed from the corresponding, in this case second winding station 7. In FIG. 3, it is shown using arrows that the first winding station 4 is moveable or pivotable from the winding position into the unloading position. Similarly, in this case, the second winding station 7 is moveable or pivotable from the unloading position (after the film bale 5 has been removed) into the winding position. The movement of the winding position into the unloading position and back into the winding position is preferably circular or approximates a circular movement. The movement could also comprise various, preferably arch-shaped segments that adjoin one another or are connected to each other by straight sections. Furthermore, a cutting device 37 is provided. The cutting device is configured to cut through the film web 2 along its entire width when the first or second winding station 4, 7 is pivoted in the direction of the unloading position, wherein the other winding station 7, 4 in question is then configured to be pivoted into the winding position to such an extent that the respective base body 4a, 7a immediately comes into contact with the now cut-off new beginning of the film web 2 and this new beginning is wound onto the base body 4a, 7a which has already been set in rotation. The cutting device preferably moves at an angle (in the X-direction and Y-direction) in order to make a straight cut in the film web 2 as a result of the speed of the film web 2. However, the cutting device could also move straight (only in the Y-direction), in which case the film web 2 would be cut at an angle.

Figure 4:
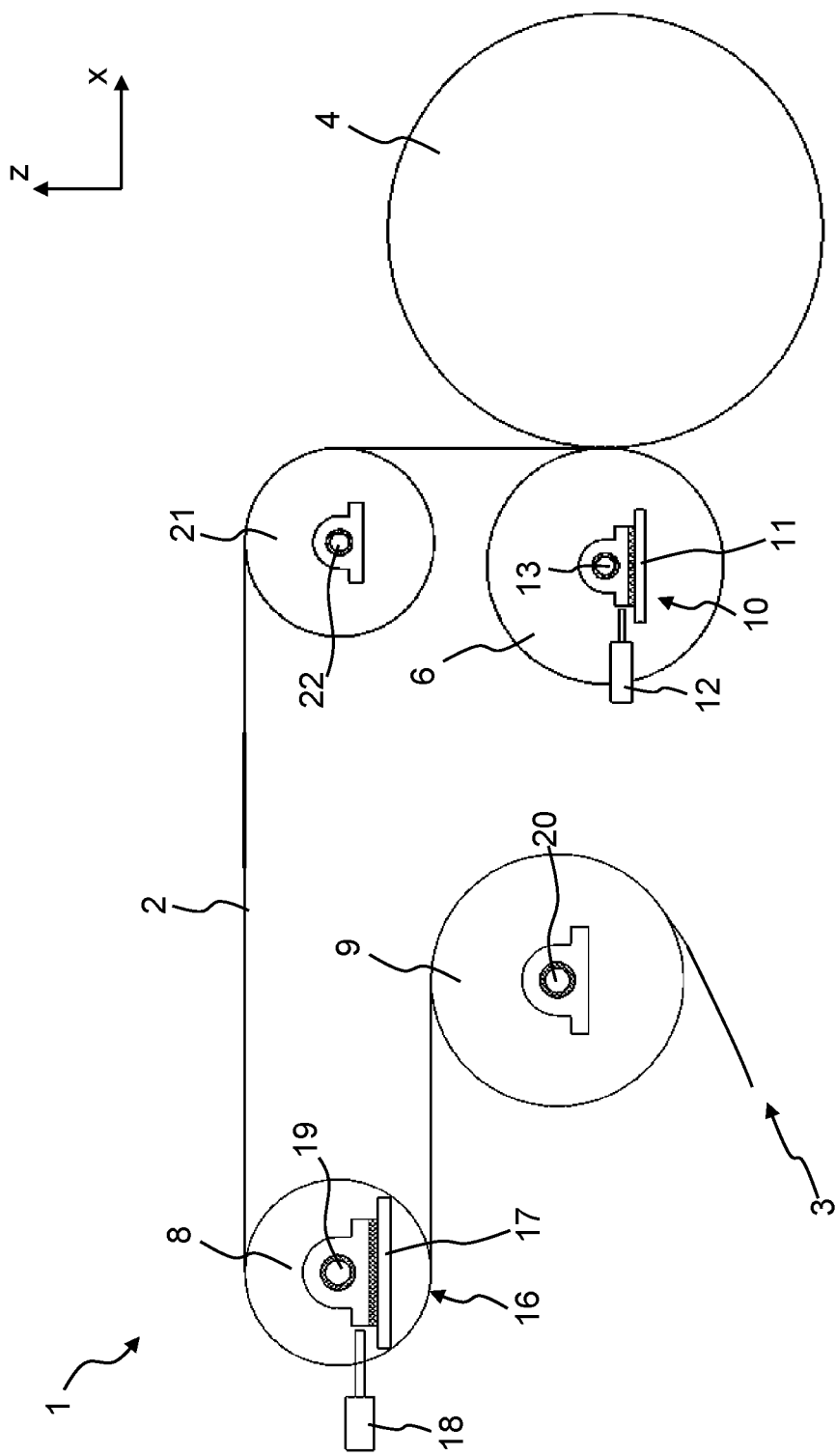
FIG. 4: a further embodiment of the film winding system comprising a compensating roller, a contact roller and two deflection rollers.

In FIG. 4, a second deflection roller 21 is shown. The second deflection roller 21 is located in the direction of travel of the film web 2 after the compensating roller 8 and before the contact roller 6. The second deflection roller 21 is preferably also mounted rotatably by means of a radial air bearing 22. It could also be mounted rotatably by means of a hydrostatic bearing.

The film web 2 runs preferably horizontally from the compensating roller 8 to the second deflection roller 21.

The second deflection roller 21 is located preferably stationarily. It can preferably not be moved relative to a motionless contact roller 6 and/or compensating roller 8.

The second deflection roller 21 is preferably driven only passively. This means that the second deflection roller 21 is solely set in rotation via the film tension of the film web 2. An electric motor is preferably dispensed with. In principle, the use of an electric motor for driving the second deflection roller 21 would however possible.

Preferably, both the compensating roller 8 and the first and second deflection roller 9, 21 have corresponding journals that are formed on their face ends with which they engage with the corresponding radial air bearing 19, 20, 22.

Figure 5:
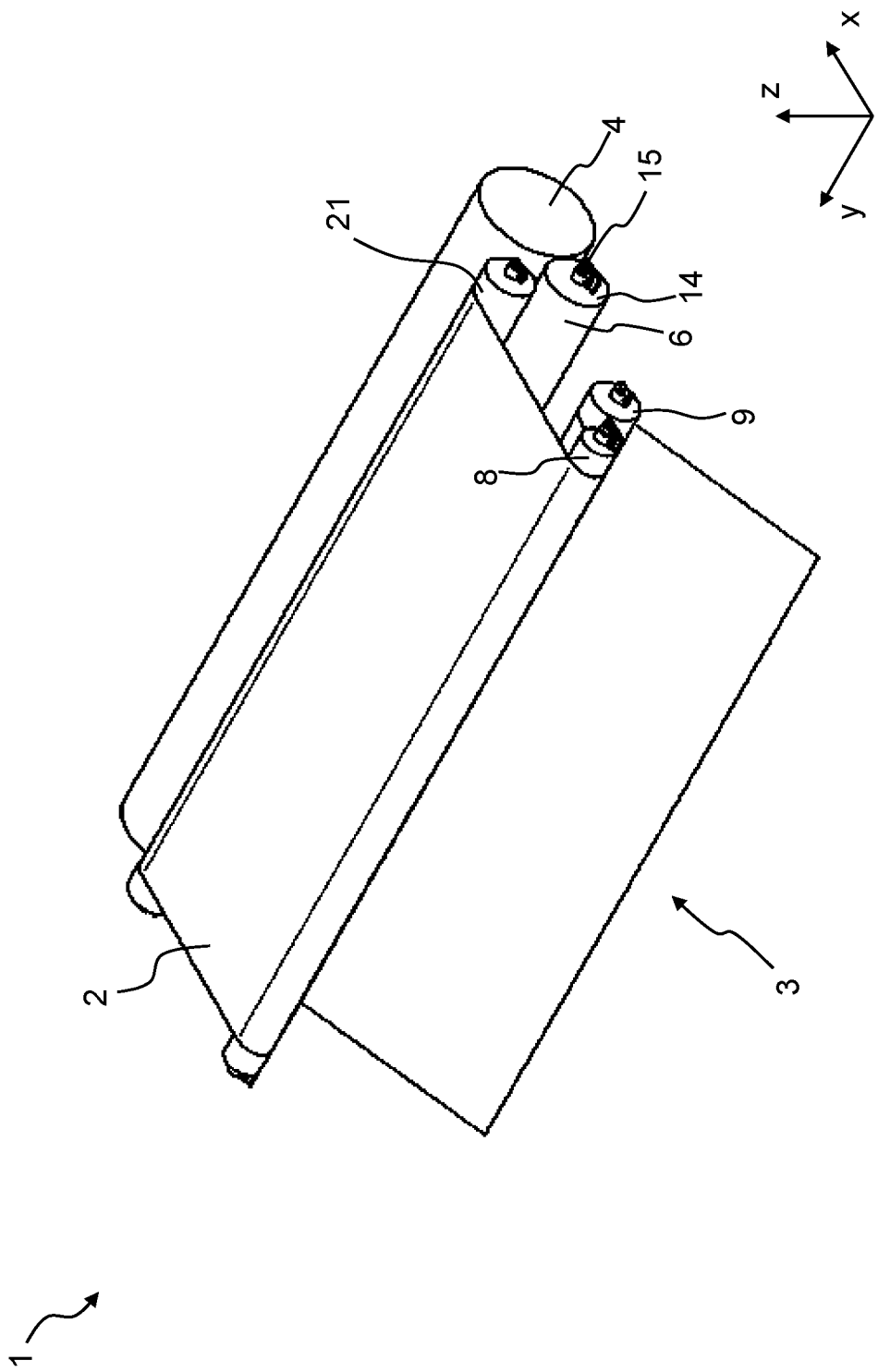
FIG. 5: a further embodiment of the film winding system from FIG. 4 in a spatial representation.

In FIG. 5, a spatial embodiment of the film winding system 1 is shown. The first deflection roller 9, the compensating roller 8, the second deflection roller 21, the contact roller 6 and the first winding station 4 can be seen.

In the corresponding drawing figures, a coordinate system is often indicated. The film web 2 is predominately moved in the X-axis. Of course, the movement vector of the film web 2 comprises in addition to a component in the X-direction, at least in sections, also a component in the Z-direction. The rollers extend in their longitudinal direction in the Y-direction.

The corresponding radial air bearings 13, 19, 20, 22 are not shown.

Preferably, a distance between the first deflection roller 9 and the contact roller 6 is less than the distance between the compensating roller 8 and the contact roller 6. As a result, as shown in FIG. 4, a higher degree of wrapping of the film web 2 can be attained via the compensating roller 8. In this example, the degree of wrapping amounts to approx. 180°.

The second deflection roller 21 is preferably located closer to the contact roller 6 than the compensating roller 8 and preferably also located closer to the contact roller 6 than the first deflection roller 9.

The diameter of the first deflection roller 9 corresponds roughly to the diameter of the second deflection roller 21, however, could also be smaller than the diameter of the second deflection roller 21. The wording "roughly" includes deviations of preferably less than 5%. The diameter of the second deflection roller 21, however, could also be less than a diameter of the first deflection roller 9. A diameter of the compensating roller 8 is preferably less than a diameter of the first deflection roller 9 and/or the second deflection roller 21 and/or the contact roller 6.

In the following, reference is made to FIGS. 6, 7 and 8. The air-bearing slide system 11 of the first adjustment device 10 comprises a first rail 23 and at least one first slide 24. Said at least one first slide 24 is located on the first rail 23. The first slide 24 comprises air outlet openings 35 that are directed in the direction of the first rail 23. The first slide 24 comprises, furthermore, an air connection 25 via which compressed air can be fed. This compressed air then exits the air outlet openings, thereby enabling the first slide to be slidable on the first rail 23.

Preferably, the first slide 24 is lifted from the first rail 23 during operation, as shown in FIG. 8. The space between the first rail 23 and the first slide 24 is shown considerably enlarged here. In fact, the space is only a few hundredths of a millimetre in size.

Additionally, the first rail 23 can be made of a material or contain such a material that has a low coefficient of friction. For example, the first rail 23 can be made of polytetrafluoroethylene or contain such material.

Preferably, the first slide 24 grasps the first rail 23 on at least three sides. The end of the first slide 24 are preferably directed at each other so that the first slide 24 can preferably not be completely lifted from the first rail 23. Thus, the movement in the Z-direction is limited and a movement in the Y-direction, thus transverse to the first rail 23, is also limited as a result. "Derailment" is therefore not possible during operation.

Preferably, the air-bearing slide system 11 of the first adjustment device 10 also comprises a second rail 26 and at least one second slide 27. The second slide 27 comprises air outlet openings that are directed in the direction of the second rail 26. The second slide 27 comprises an air connection 28 via which compressed air can be fed. This compressed air then exits the air outlet openings, thereby enabling the second slide 27 to be slidable on the second rail 26.

The second rail 26 runs parallel to the first rail 23.

In principle, it is also conceivable that the air-bearing slide system 11 of the first adjustment device 10 comprises a third slide 41 that is also located on the first rail 23. The third slide would similarly comprise air outlet openings that are directed in the direction of the first rail 23. The third slide would also comprise an air connection via which compressed air can be fed. This compressed air then exits the air outlet openings, thereby enabling the third slide to be slidable on the first rail 23. The first rail 23 preferably runs continuously or could also be divided into two rail sections that are spaced apart. The first slide 23 would be located on the first rail section and the third rail on the second rail section.

The same can also apply to the second rail 26 of the air-bearing slide system 11 of first adjustment device 10. A fourth slide could also be located here. The second rail 26 preferably runs continuously or could also be divided into two rail sections that are spaced apart.

Something else could also apply to the air-bearing slide system 17 of the second adjustment device 16 with regard to the compensating roller 8. This air-bearing slide system 17 can also comprise a first rail and at least a first slide that is located on the first rail. The first slide comprises air outlet openings that are directed in the direction of the first rail. The first slide comprises an air connection to allow the feeding of compressed air that then exits the air outlet openings, thereby enabling the first slide to be slidable on the first rail. In principle, the second adjustment device could also comprise a second rail with a second slide. Two slides could also be located on each rail.

In FIG. 7, another embodiment of a radial air bearing 13, 19, 20, 22 is shown, on which individual rollers could be supported. The respective radial air bearing 13, 19, 20, 22 comprises an air connection 29 via which compressed air can be fed. This compressed air then flows out via air outlet openings to the inner side of the corresponding radial air bearing 13, 19, 20, 22 thereby minimising the friction between the respective journal 15 and the respective radial air bearing 13, 19, 20, 22.

The corresponding radial air bearing 13, 19, 20, 22 can be made of a material or contain such a material that has a low coefficient of friction. For example, the first rail 23 can be made of polytetrafluoroethylene or contain such material.

Figure 9:
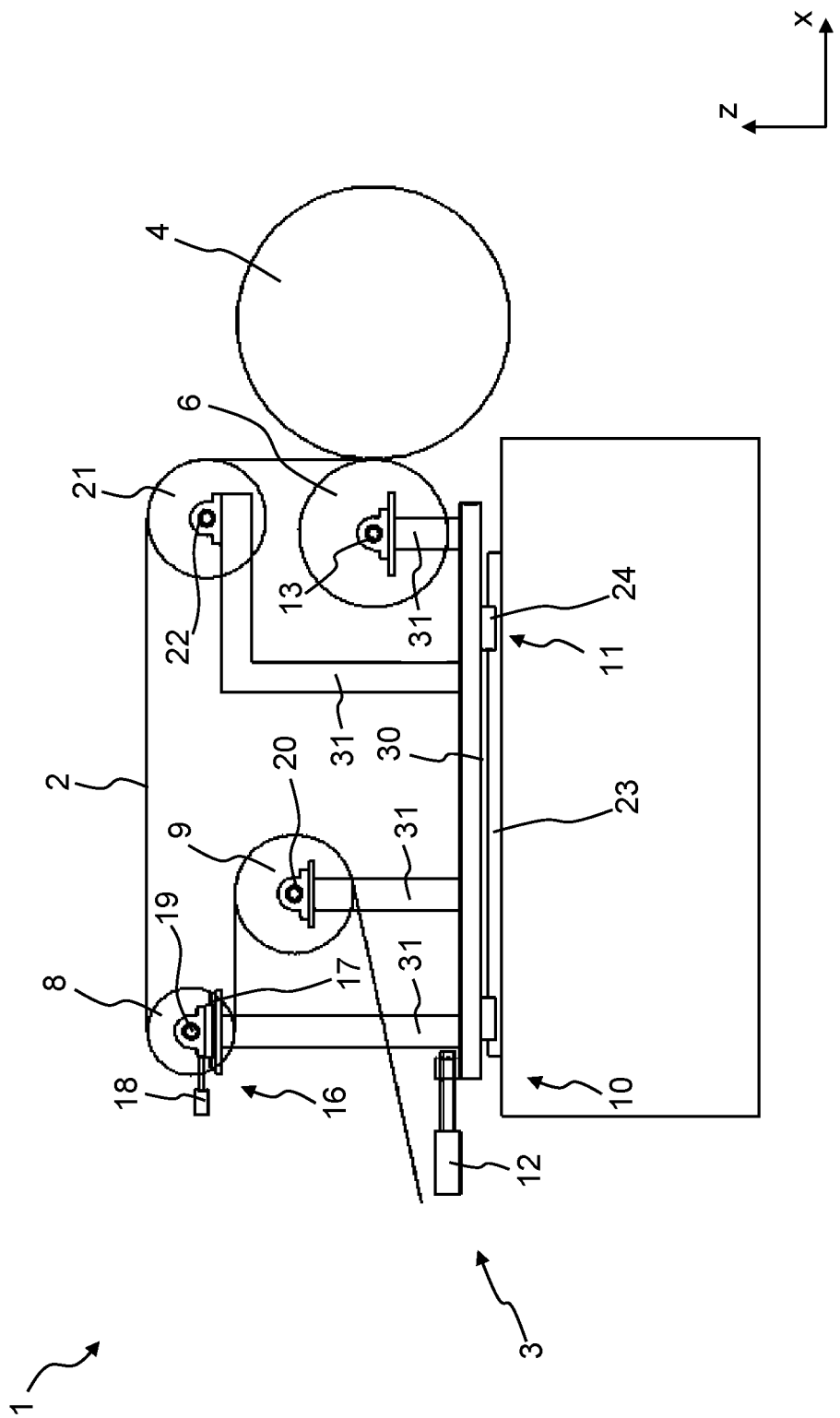
FIG. 9: an embodiment of the film winding system, wherein the contact roller, the first and the second deflection roller and the compensating roller are moveable collectively via the air-bearing slide system of the first adjustment device.
Figure 10:
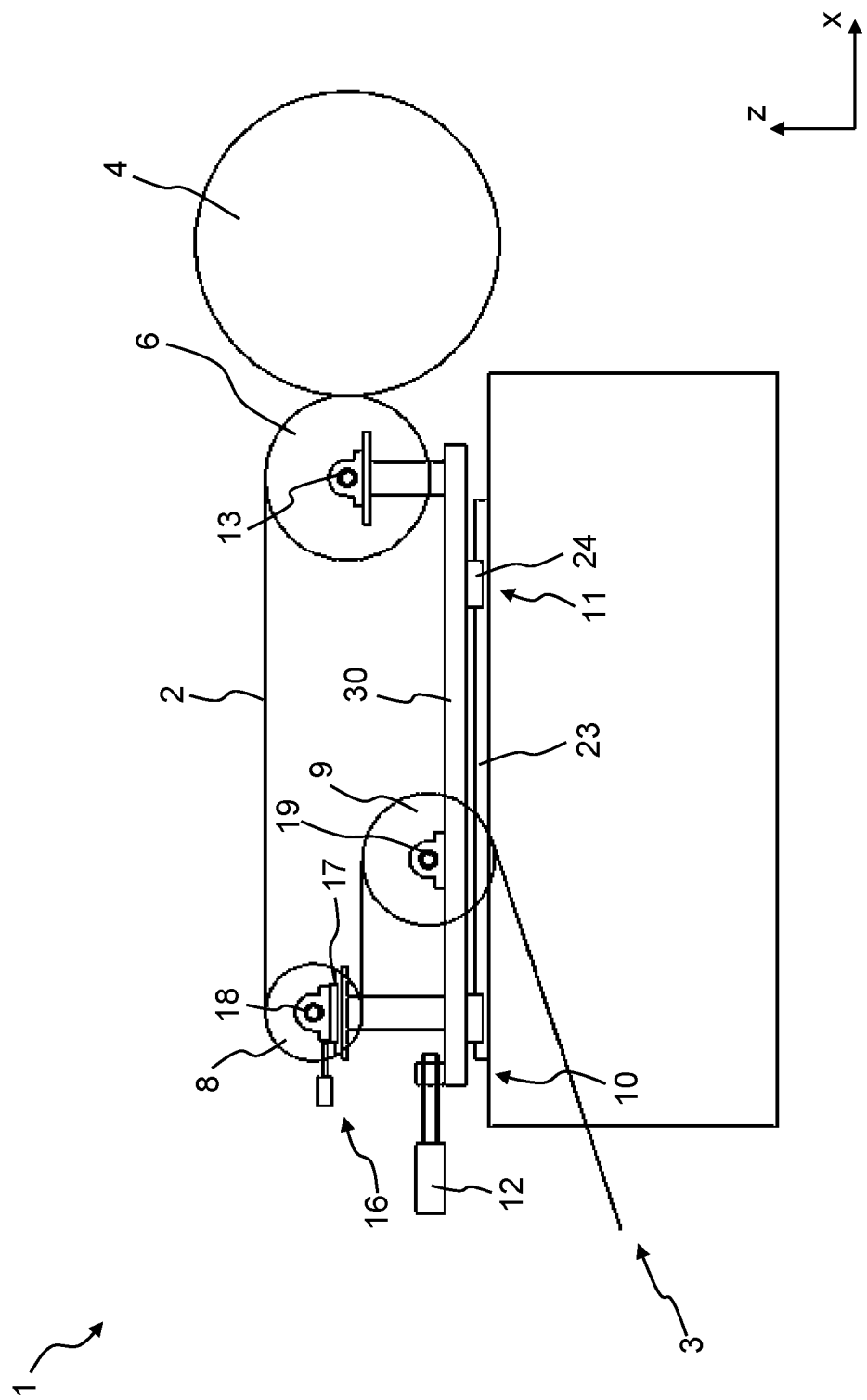
FIG. 10: an embodiment of the film winding system, wherein the contact roller, the first deflection roller and the compensating roller are moveable collectively via the air-bearing slide system of the first adjustment device.

The FIGS. 9 and 10 show a further embodiment of the film winding system 1. In this case, a contact roller frame 30 is provided. The contact roller frame 30 is located on the air-bearing slide system 11 or the hydrostatic-bearing slide system of the first adjustment device 10. The contact roller 6 is also located on the contact roller frame 30 (e.g. via an corresponding support 31) so that the contact roller 6 and the contact roller frame 30 are moveable collectively, thus synchronously.

Furthermore, the first deflection roller 9 and the second deflection roller 21 and the compensating roller 8 are also shown located on the contact roller frame 30. If the air-bearing slide system 11 of the first adjustment device 10 is actuated, the first deflection roller 9, the second deflection roller 21 and the compensating roller 8 are also moved. In this case, this process occurs synchronously. Only the compensating roller 8 still has its second adjustment device 16 comprising its air-bearing slide system 17 and can be moved independently of the first adjustment device 10.

The movement vector of the first air-bearing slide system 11 runs preferably solely in the X-direction, thus in the direction through which the film web 2 runs through the film stretching unit 110. Optionally, the movement vector could also have a component in the Z-direction, thus in the direction of the ground or away from the ground. The movement vector is preferably free of a component in the Y-direction.

In FIG. 10, an embodiment of the film winding system 1 is shown without the second deflection roller 21. The film web 2 runs substantially horizontally from the compensating roller 8 to the contact roller 6. The first deflection roller 9 is located preferably closer to the contact roller frame 30 than the compensating roller 8 and the contact roller 6.

Figure 11:
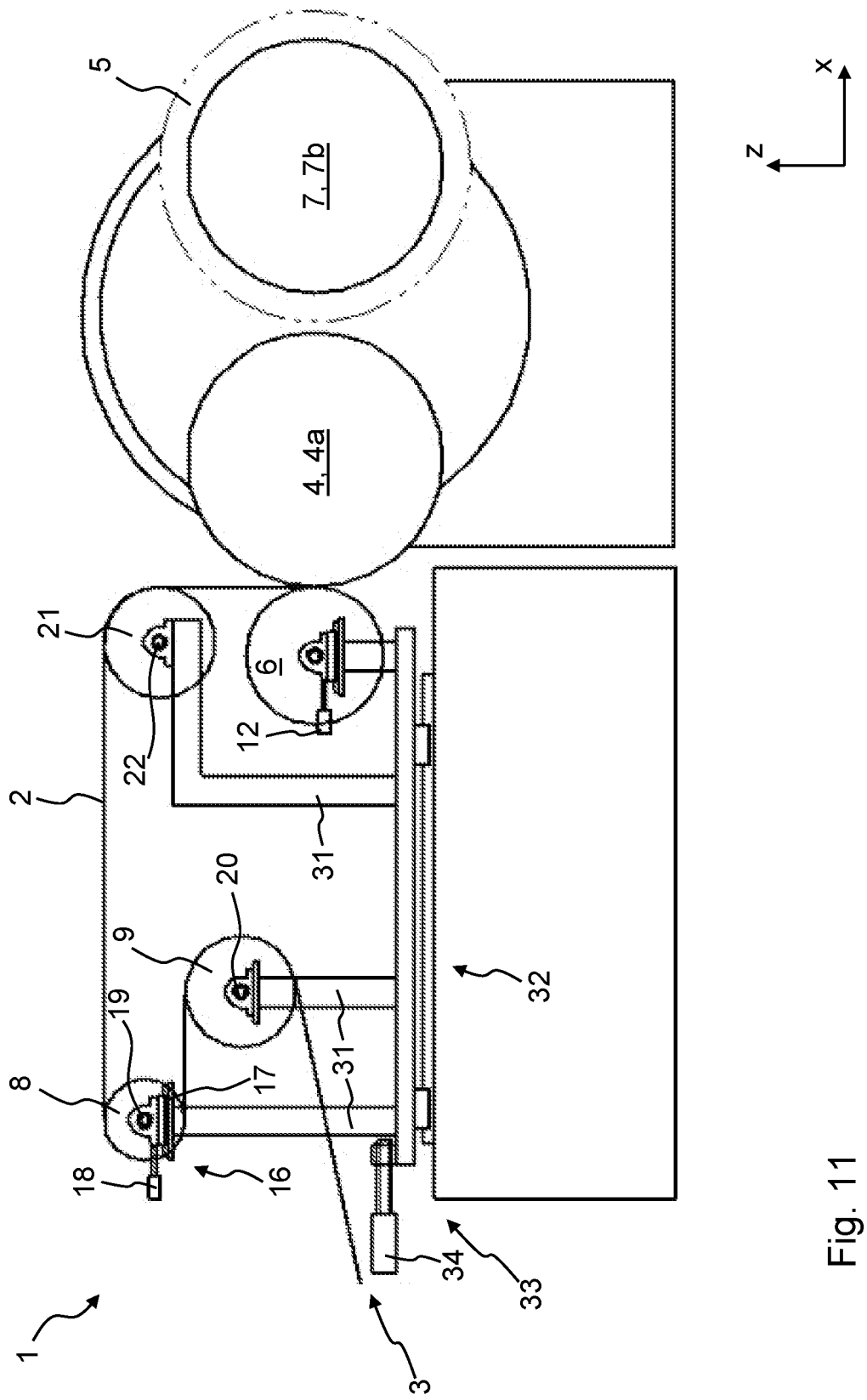
FIG. 11: an embodiment of the film winding system, wherein the contact roller, the first deflection roller, the second deflection roller and the compensating roller are located together on a base frame and are moveable collectively via a base adjustment device.

FIG. 11 describes an embodiment of the film winding system 1, wherein the contact roller 6, the first deflection roller 9, the second deflection roller 21 and the compensating roller 8 are located together on a base frame 32 and are moveable collectively via a base adjustment device 33. In this case, the base adjustment device 33 comprises an adjusting spindle 34. Via this adjusting spindle 34, the base frame 32 is moveable towards the winding station 4 or away from the winding station 4. Instead of an adjusting spindle 34, the base frame 32 could also be located on an air-bearing slide system which is moved, for example, by means of a linear motor. At the same time, there is still a first adjustment device 10 and a second adjustment device 16. This means that the contact roller 6 and the compensating roller 8 can be moved in addition independently of the base frame 32 being moved.

Figure 12:
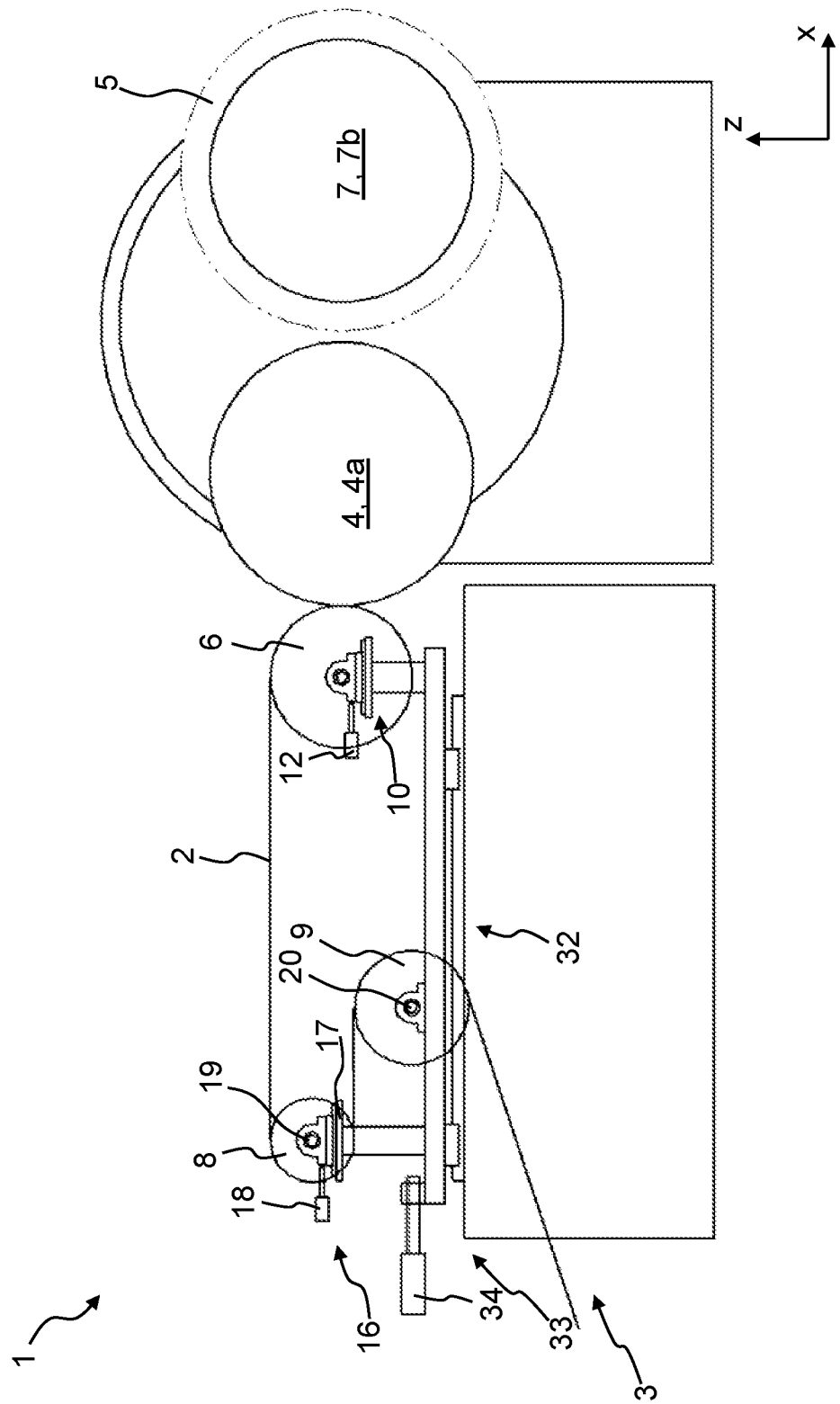
FIG. 12: an embodiment of the film winding system, wherein the contact roller, the first deflection roller and the compensating roller are located together on a base frame and are moveable collectively via a base adjustment device.

FIG. 12 describes an embodiment of the film winding system 1 as already known from FIG. 11. In contrast to FIG. 11, the film winding system 1 from FIG. 12 does not have a second deflection roller 21. Preferably, the film web 2 runs horizontally between the compensating roller 8 and the contact roller 6, thus parallel to the ground.

Figure 13:
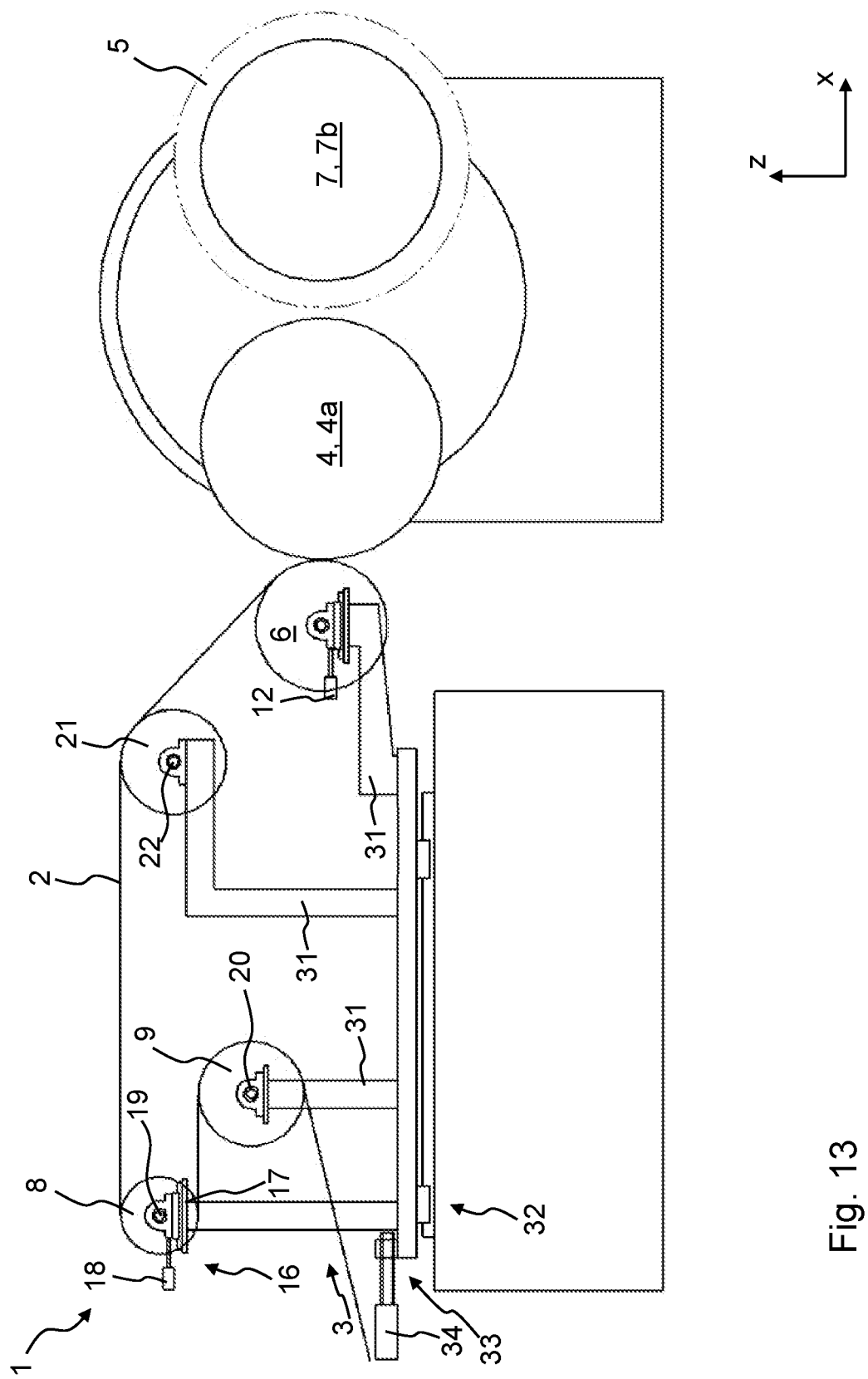
FIG. 13: an embodiment of the film winding system, wherein the contact roller, the first deflection roller, the second deflection roller and the compensating roller are located together on a base frame and are moveable collectively via a base adjustment device and wherein a degree of wrapping of the film web across the contact roller amounts to approximately 60°.

FIG. 13 describes an embodiment of the film winding system 1 as already known from FIG. 11. In contrast to FIG. 11, the film web 2 does not run only in the vertical direction between the deflection roller 21 and the contact roller 6, thus perpendicular to the ground, but also with a horizontal component (movement vector in the X-direction) and a vertical component (movement vector in the Y-direction). As a result, the degree of wrapping of the film web 2 can be set via the contact roller 6. In the example from FIG. 13, this amounts to approx. 60°. The degree of wrapping is preferably larger than 0.5°, 5°, 10°, 15°, 20°, 25°, 30°, 35°, 40°, 45°, 50°, 55°, 60°, 65°, 70°, 75°, 80° or larger than 85°. The degree of wrapping is preferably smaller than 95°, 95°, 90°, 85°, 80°, 75°, 70°, 60°, 55°, 50°, 45°, 40°, 35°, 30°, 25°, 20°, 15°, 10° or smaller than 5°.

If the base adjustment device 33 is controlled in such a way that this moves the base frame 32 away from the winding station 4 and if the first adjustment device 10 is controlled in such a way that the contact roller 6 is moved away from the second deflection roller 21, the degree of wrapping is increased. If the base adjustment device 33 is controlled in such a way that this moves the base frame 32 towards the winding station 4 and if the first adjustment device 10 is controlled in such a way that the contact roller 6 is moved towards the second deflection roller 21, the degree of wrapping is decreased.

Figure 14:
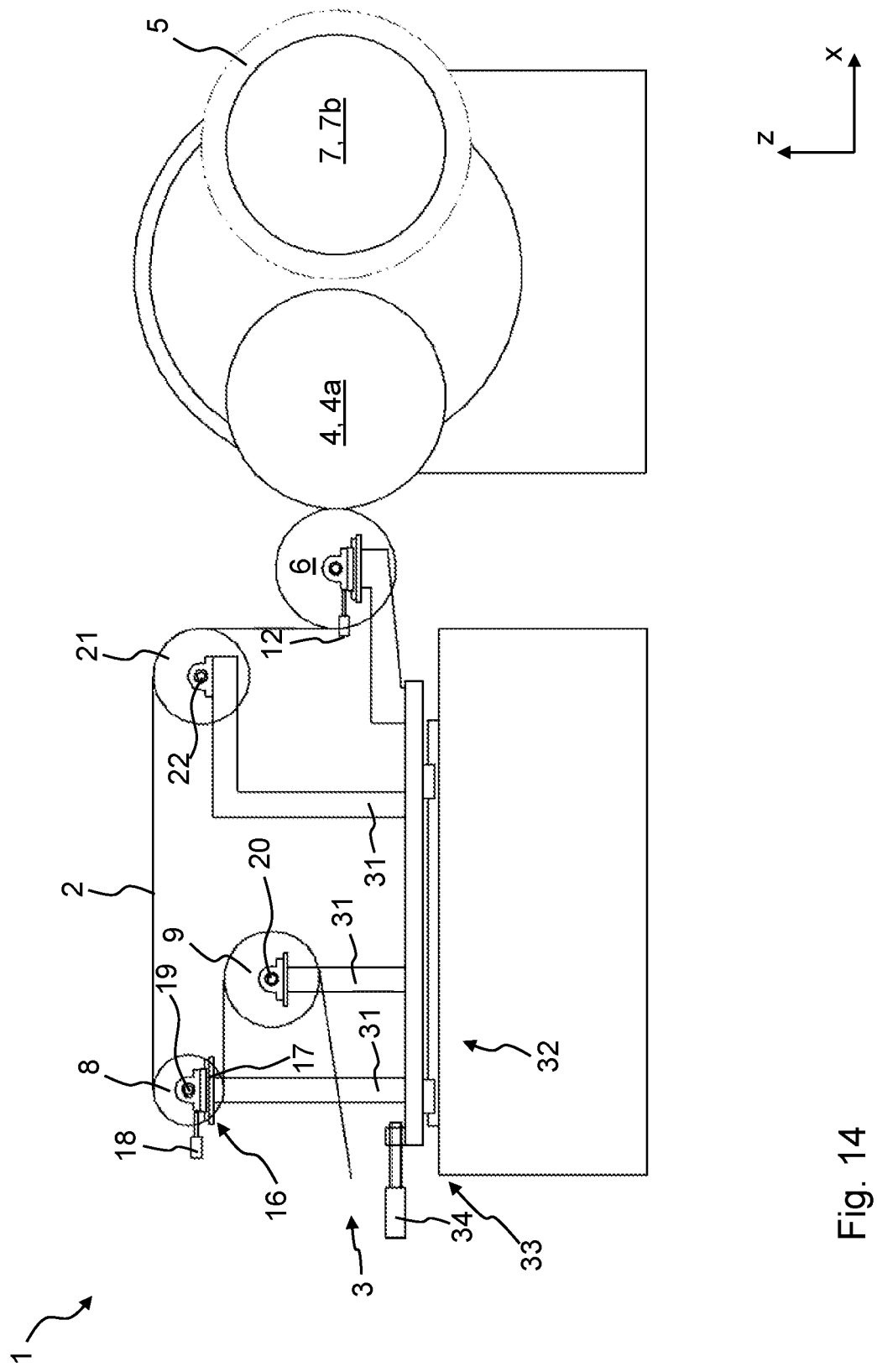
FIG. 14: an embodiment of the film winding system, wherein the contact roller, the first deflection roller, the second deflection roller and the compensating roller are located together on a base frame and are moveable collectively via a base adjustment device and wherein a degree of wrapping of the film web across the contact roller amounts to approximately 180°.

FIG. 14 describes an embodiment of the film winding system 1 as already known from FIG. 13. In contrast to FIG. 13, the contact roller 6 rotates in the opposite direction (anticlockwise). The film web 2 runs preferably only in the vertical direction between the second deflection roller 21 and the contact roller 6, thus perpendicular to the ground. The second deflection roller 21 is spaced further from the ground than the contact roller 6. In this case, the degree of wrapping amounts to roughly 180°. In this case, the centre of the second deflection roller 21 is spaced further away from the winding station 4 than the centre of the contact roller 6. Preferably, the film web 2 leaves the second deflection roller 21 at the three o'clock position and reaches the contact roller 6 at the nine o'clock position. After the contact roller 6 then takes the film web 2 180°, the film web 2 leaves the contact roller 6 at the three o'clock position and is fed to the winding station 4. Relative to the contact roller 6, the winding station 4 is located at roughly the three o'clock position. The second deflection roller 21 can be located closer to the ground than the contact roller 6. In this case, the contact roller 6 would rotate clockwise.

The rollers are preferably made of metal or a metal alloy or contain metal or a metal alloy. Preferably, chrome is used. Alternatively, the rollers made of a reinforced carbon composite (RCC) can be used or a combination of metal rollers and RCC rollers.

The compensating roller 8 is preferably free of swinging.

The speed of the film web 2 at the contact roller 6 amounts to approx. 10 to 100 m/min.

According the disclosure, instead of the first adjustment device 10 at the contact roller 6, the second adjustment device 16 at the compensating roller 8 can also be used. In principle, it is also conceivable that instead of the first adjustment device 10 at the contact roller 6, the radial air bearing 13, 19, 20, 22 at the contact roller 6, the compensating roller 8, the first deflection roller 9 and/or at the second deflection roller 21 are also used.

The disclosure is not limited to the embodiments described. Within the scope of the disclosure, all described and/or drawn features can be combined with each other as desired.

The invention claimed is:

1. A film winding system for a film stretching unit comprising the following features:
   a film entry area is provided, via which a film web to be wound up is feedable to the film winding system;
   a first winding station is provided, wherein the first winding station is configured in a winding position to wind the film web into a film bale;
   a contact roller and a compensating roller are provided, wherein the contact roller is arranged adjacent to the first winding station in the winding position and is configured to guide the film web to the first winding station;
   the compensating roller is located before the contact roller in the direction of travel of the film web and is configured to guide the film web to the contact roller and to set a film tension;

a first adjustment device is provided and configured to move the contact roller towards the winding station or away from the winding station, thereby enabling the setting of a specific contact pressure between the contact roller and the film bale;
comprising the following feature:
the first adjustment device comprises a slide system or an adjusting spindle
the slide system is an air-bearing slide system or a hydrostatic-bearing slide system;
the air-bearing slide system of the first adjustment device comprises a first rail and at least a first slide that is located on the first rail;
the first slide comprises air outlet openings that are directed in the direction of the first rail; and
the first slide comprises an air connection to allow the feeding of compressed air that then exits the air outlet openings, thereby enabling the first slide to be slidable on the first rail.

2. The film winding system according to claim 1, comprising the following features:
the air-bearing slide system of the first adjustment device comprises a second rail and at least a second slide that is located on the second rail;
the second slide comprises air outlet openings that are directed in the direction of the second rail;
the second slide comprises an air connection to allow the feeding of compressed air that then exits the air outlet openings, thereby enabling the second slide to be slidable on the second rail;
the second rail runs parallel to the first rail.

3. The film winding system according to claim 1, comprising the following features:
the air-bearing slide system of the first adjustment device comprises a third slide which is located on the first rail;
the third slide comprises air outlet openings that are directed in the direction of the first rail;
the third slide comprises an air connection to allow the feeding of compressed air that then exits the air outlet openings, thereby enabling the third slide to be slidable on the first rail;
the first rail runs continuously or is divided into two rail sections for the first and the third slides, said rail sections being are spaced apart.

4. The film Film-winding system according to claim 1, comprising the following features:
the first adjustment device comprises:
a) a first and a second radial air bearing; or
b) a first and a second hydrostatic bearing;
the contact roller comprises first and second journals in the area of the first and the second end face, said journals being supported in the first and second radial air bearings or hydrostatic bearings.

5. The film winding system according to claim 1, comprising the following feature:
the first adjustment device also comprises a linear motor that is configured to move the contact roller via the slide system towards the first winding station or away from the first winding station; or
the first adjustment device comprises an electric motor that is configured to rotate the adjusting spindle, thereby enabling the contact roller to be moveable towards the first winding station or away from the first winding station.

6. The film winding system according to claim 1, comprising the following features:
a first deflection roller is provided;
the first deflection roller is located in the direction of travel of the film web before the compensating roller.

7. The film winding system according to claim 6, comprising the following feature:
the first deflection roller is mounted rotatably by means of radial air bearings or hydrostatic bearings.

8. The film winding system according to claim 1, comprising the following features:
a second deflection roller is provided;
the second deflection roller is located in the direction of travel of the film web after the compensating roller and before the contact roller.

9. The film winding system according to claim 8, comprising the following feature:
the second deflection roller is mounted rotatably by means of radial air bearings or hydrostatic bearings.

10. The film winding system according to claim 1, comprising the following features:
a contact roller frame is provided;
the slide system of the first adjustment device or the adjusting spindle is located on the contact roller frame so that the contact roller is moveable relative to the contact roller frame; or
the contact roller frame is located on the slide system or the adjusting spindle of the first adjustment device, wherein the contact roller is located on the contact roller frame so that the contact roller and the contact roller frame are moveable collectively.

11. The film winding system according to claim 1, comprising the following feature:
a base adjustment device is provided that comprises a base frame and an air-bearing slide system or a hydrostatic-bearing slide system or an adjusting spindle;
the contact roller and the compensating roller and the first deflection roller and/or the second deflection roller are located on the base frame;
the base adjustment device is configured to move the contact roller, the compensating roller, the first deflection roller and/or the second deflection roller towards the winding station or away from the winding station.

12. The film winding system according to claim 1, comprising the following features:
a second adjustment device is provided and configured to move the compensating roller towards the contact roller or away from the contact roller, thereby enabling the setting of a specific film tension;
the second adjustment device comprises an air-bearing slide system or a hydrostatic-bearing slide system or an adjusting spindle.

13. The film winding system according to claim 12, comprising the following features:
the air-bearing slide system of the second adjustment device comprises a first rail and at least a first slide that is located on the first rail;
the first slide comprises air outlet openings that are directed in the direction of the first rail;
the first slide comprises an air connection to allow the feeding of compressed air that then exits the air outlet openings, thereby enabling the first slide to be slidable on the first rail.

14. The film winding system according to claim 12, comprising the following feature:
the second adjustment device comprises a linear motor that is configured to move the compensating roller via the air-bearing slide system or the hydrostatic-bearing slide system towards the contact roller or away from the contact roller; or the second adjustment device comprises an electric motor that is configured to rotate the adjusting spindle, thereby enabling the compensating roller to be moveable towards the first winding station or away from the first winding station.

15. The film winding system according to claim 1, comprising the following features:

the compensating roller is mounted rotatably by means of radial air bearings or hydrostatic bearings.

16. The film winding system according to claim 1, comprising the following features:

the first winding station comprises a base body, wherein the base body of the first winding station is rotationally displaceable and wherein the film web is windable around the base body;

a second winding station comprising a base body, wherein the base body of the second winding station is rotationally displaceable and wherein the film web is windable around the base body;

the first winding station is configured to be pivoted from the winding position, in which it is arranged adjacent to the contact roller, into an unloading position, wherein the wound film bale is removable from the first winding station in the unloading position, wherein the second winding station is configured to be pivoted at the same time from the unloading position into the winding position;

a cutting device is provided;

a cutting device is configured to cut the film web across its width when the first winding station is pivoted in the direction of the unloading position, wherein the second winding station is configured to be pivoted further into the winding position in such a way that the base body of the second winding station immediately comes into contact with the new beginning of the film web now formed.

17. The film winding system according to claim 1, comprising the following features:

at least one discharge device is provided;

the discharge device is located in the area of the film web and is configured to discharge electrical charge on the film web and/or film bale.

18. An assembly comprising a film stretching unit and the film winding system according to claim 1, comprising the following features:

a plastic melt is feedable at the entry area of the film stretching unit;

the film stretching unit comprises different zones in which the plastic melt is heated and/or the film web is stretched;

an exit area of the film stretching unit is connected to the film entry area of the film winding system.

* * * * *